United States Patent [19]

Farrall et al.

[11] Patent Number: 5,047,893
[45] Date of Patent: Sep. 10, 1991

[54] HIGH-FREQUENCY CAPACITOR

[75] Inventors: George A. Farrall, Rexford; Joseph C. Borowiec, Schenectady, both of N.Y.

[73] Assignee: General Electric Company, Schenectady, N.Y.

[21] Appl. No.: 586,927

[22] Filed: Sep. 24, 1990

[51] Int. Cl.$^5$ .................. H02B 1/18; H05K 7/20; H05B 37/00; H01G 4/08
[52] U.S. Cl. .................. 361/377; 361/323; 361/386; 315/290
[58] Field of Search ............... 361/323, 377, 381, 386; 315/289, 290

[56] References Cited

U.S. PATENT DOCUMENTS

| | | |
|---|---|---|
| 4,527,098 | 7/1985 | Owen .................. 315/290 |
| 4,625,260 | 11/1986 | Jordan et al. .................. 361/386 |
| 4,783,615 | 11/1988 | Dakin .................. 315/248 |

Primary Examiner—Donald A. Griffin
Attorney, Agent, or Firm—Jill M. Breedlove; James C. Davis, Jr.; Marvin Snyder

[57] ABSTRACT

A high-frequency capacitor includes first and second conductive members, each having a plurality of U-shaped metal plates disposed parallel to each other and a terminal plate coupled between the ends thereof. The metal plates of the first and second conductive members are interleaved, and a dielectric material is disposed between the adjacent metal plates. The result is a low-inductance capacitor suitable for use in a high-frequency electronic circuit, such as an electrodeless high intensity discharge (HID) lamp ballast. Furthermore, such acapacitor may be suitably integrated with a heat sink in an electrodeless HID lamp ballast.

22 Claims, 5 Drawing Sheets

HIGH-FREQUENCY CAPACITOR

FIELD OF THE INVENTION

The present invention relates generally to capacitors. More particularly, the present invention relates to a capacitor suitable for use in a high-frequency electronic circuit, such as an electrodeless high intensity discharge lamp ballast.

BACKGROUND OF THE INVENTION

In a high intensity discharge (HID) lamp, a medium to high pressure ionizable gas, such as mercury or sodium vapor, emits visible radiation upon excitation typically caused by passage of radio frequency (RF) current through the gas. One class of HID lamps comprises electrodeless lamps which generate an arc discharge by establishing a solenoidal electric field in a high-pressure gaseous lamp fill comprising the combination of a metal halide and an inert buffer gas. In particular, the lamp fill, or discharge plasma, is excited by RF current in an excitation coil surrounding an arc tube which contains the fill. The arc tube and excitation coil assembly acts essentially as a transformer which couples RF energy to the plasma. That is, the excitation coil acts as a primary coil, and the plasma functions as a single-turn secondary. RF current in the excitation coil produces a changing magnetic field, in turn creating an electric field in the plasma which closes completely upon itself, i.e., a solenoidal electric field. Current flows as a result of this electric field, thus producing a toroidal arc discharge in the arc tube.

To maximize efficiency of an HID lamp, the coefficient of electromagnetic coupling between the excitation coil and the solenoidal discharge must be maximized. Since the degree of coupling increases with frequency, electronic ballasts used to drive HID lamps operate at high frequencies in the range from 0.1-20 MHz, exemplary operating frequencies being 13.56 and 6.78 MHz. These exemplary frequencies are within the industrial, scientific, and medical band of the electromagnetic spectrum in which moderate amounts of electromagnetic radiation are permissible; and such radiation is generally emitted by an electrodeless HID lamp system.

A suitable electrodeless HID lamp ballast is described in commonly assigned of J. C. Borowiec and S. A. El-Hamamsy, copending U.S. patent application 472,144, filed Jan. 30, 1990, which patent application is incorporated by reference herein. Operation of an electrodeless HID lamp ballast at the resonant frequency of the ballast load circuit maximizes power output, while operation at a frequency slightly lower than the resonant frequency of the load circuit maximizes ballast efficiency. Hence, for maximum efficiency, operation is slightly "off" resonance, and a specific ballast load amplitude and phase angle are required. To this end, the impedance of the ballast load, including that of the arc discharge as reflected into the ballast load, must be matched to the required ballast load resistance and phase angle. As described in U.S. patent application Ser. No. 472,144, cited hereinabove, a capacitance connected in parallel with the excitation coil is needed to match the resistive component of the ballast load impedance, and a capacitance connected in series with the excitation coil is needed to obtain the proper phase angle.

To meet the relatively large current requirements of an electronic HID lamp ballast using standard RF capacitors, such as multilayered ceramic capacitors and RF transmission capacitors, several standard-valued RF capacitors must be connected in parallel. Such a configuration is usually bulky. In addition, as the number of ballast circuit elements increases, the number of electrical leads and connections increases, resulting in more resistive losses. Moreover, electrical leads have parasitic inductances associated therewith which may introduce additional resonances into the ballast load circuit. An additional resonance resulting from a parasitic inductance introduces waveform distortion and increases power dissipation, thereby reducing efficiency.

OBJECTS OF THE INVENTION

Accordingly, an object of the present invention is to provide a new and improved capacitor suitable for use in a high-frequency electronic circuit, such as an electrodeless HID lamp ballast.

Another object of the present invention is to provide a high-frequency capacitor configured so as to introduce negligible inductance into the circuit in which it is employed.

SUMMARY OF THE INVENTION

The foregoing and other objects of the present invention are achieved in a high-frequency capacitor including first and second conductive members, each comprising a plurality of U-shaped metal plates disposed parallel to each other and a terminal plate coupled between the ends thereof. The metal plates of the first and second conductive members are interleaved, and a dielectric material is disposed between the adjacent metal plates. The result is a low-inductance capacitor.

A high-frequency capacitor according to the present invention may be advantageously employed in an electrodeless HID lamp ballast. Furthermore, such a capacitor may be suitably integrated with a heat sink in an electrodeless HID lamp ballast for removing heat resulting from coil resistive losses and from convection from the hot arc tube to the coil.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
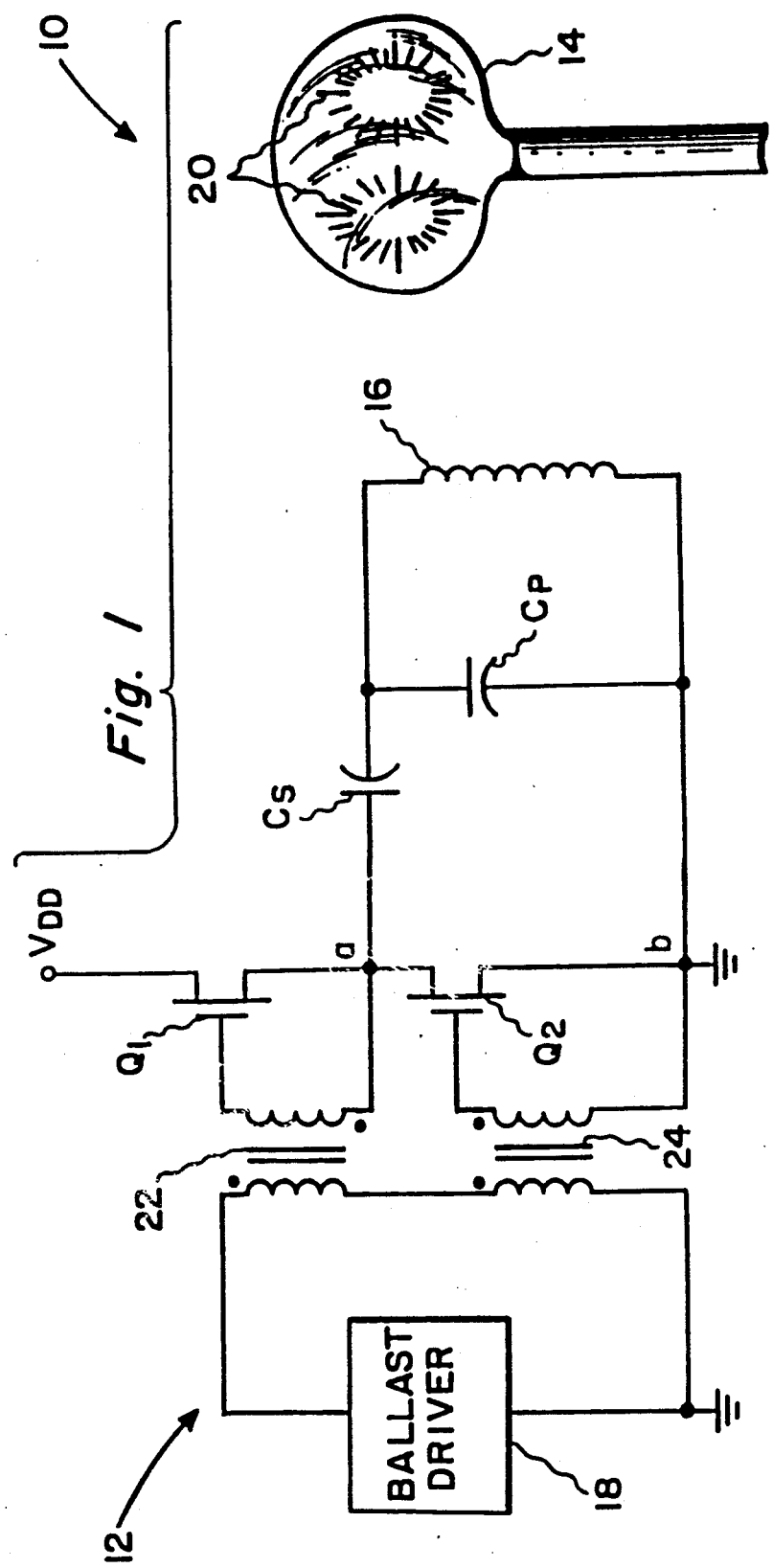
FIG. 1 is a schematic diagram of an electrodeless HID lamp and ballast.

FIG. 1 schematically illustrates an electrodeless HID lamp 10 and associated ballast 12 such as those described in U.S. patent application Ser. No. 472,144, cited hereinabove. The HID lamp includes an arc tube 14 formed of a high temperature glass, such as fused quartz, or an optically transparent ceramic, such as polycrystalline alumina. Arc tube 14 contains a fill which may comprise at least one metal halide, such as sodium iodide, and a buffer gas, such as xenon. Electrical power is applied to the HID lamp by an excitation coil 16 disposed about arc tube 14 which is driven by an RF signal via a ballast driver 18 and ballast 12. (For clarity of illustration, coil 16 is not shown in its operational position about arc tube 14.) A suitable excitation coil 16 may comprise, for example, a coil having a configuration such as that described in commonly assigned G. A. Farrall, copending U.S. patent application Ser. No. 493,266, filed Mar. 14, 1990, which patent application is incorporated by reference herein. The overall shape of the excitation coil of the Farrall application is generally that of a surface formed by rotating a bilaterally symmetrical trapezoid about a coil center line situated in the same plane as the trapezoid, but which line does not intersect the trapezoid. Such a coil configuration results in very high efficiency and causes only minimal blockage of light from the lamp.

In operation, RF current in coil 16 results in a time-varying magnetic field which produces within arc tube 14 an electric field that completely closes upon itself. Current flows through the fill within arc tube 14 as a result of this solenoidal electric field, producing a toroidal arc discharge 20 in arc tube 14. The operation of an exemplary electrodeless HID lamp is described in commonly assigned Dakin U.S. Pat. No. 4,783,615, issued on Nov. 8, 1988, which patent is incorporated by reference herein.

HID lamp ballast 12 is illustrated in FIG. 1 as comprising a Class-D power amplifier including two switching devices $Q_1$ and $Q_2$ connected in series with a dc power supply $V_{DD}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 18 via input isolation transformers 22 and 24, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 18 may comprise means for generating two out-of-phase sinusoidal signals, as described in U.S. patent application Ser. No. 454,614 of S. A. ElHamamsy and G. Jernakoff, filed Dec. 21, 1989, which patent application is incorporated by reference herein.

A resonant load network is connected to the half-bridge at the junction between switching devices $Q_1$ and $Q_2$ and in parallel with switching device $Q_2$. The resonant load network comprises the excitation coil 16 of HID lamp 10 and a tuning capacitor $C_p$ connected in parallel therewith. The parallel combination of capacitor $C_p$ and coil 16 functions as an impedance transformer to reflect the impedance of the arc discharge 20 into the ballast load. A blocking/tuning capacitor $C_s$ is connected in series with the parallel combination of coil 16 and capacitor $C_p$. In particular, capacitor $C_s$ is used both for blocking dc voltage and for resonant circuit tuning.

Capacitors $C_s$ and $C_p$ are chosen to ensure impedance matching for maximum efficiency. That is, these capacitors are chosen to ensure that the ballast load is designed for optimum values of resistance and phase angle. As described in U.S. patent application Ser. No. 472,144, cited hereinabove, the excitation coil of the HID lamp acts as the primary of a loosely-coupled transformer, while the arc discharge acts as both a single-turn secondary and secondary load. The impedance of the arc discharge is reflected to the primary, or excitation coil, side of this loosely-coupled transformer. To match the ballast load impedance for maximum efficiency, the parallel capacitor operates with the excitation coil to match the proper resistive load value, and the series capacitor acts with the combination of the excitation coil and parallel capacitance to yield the required phase angle.

Figure 2:
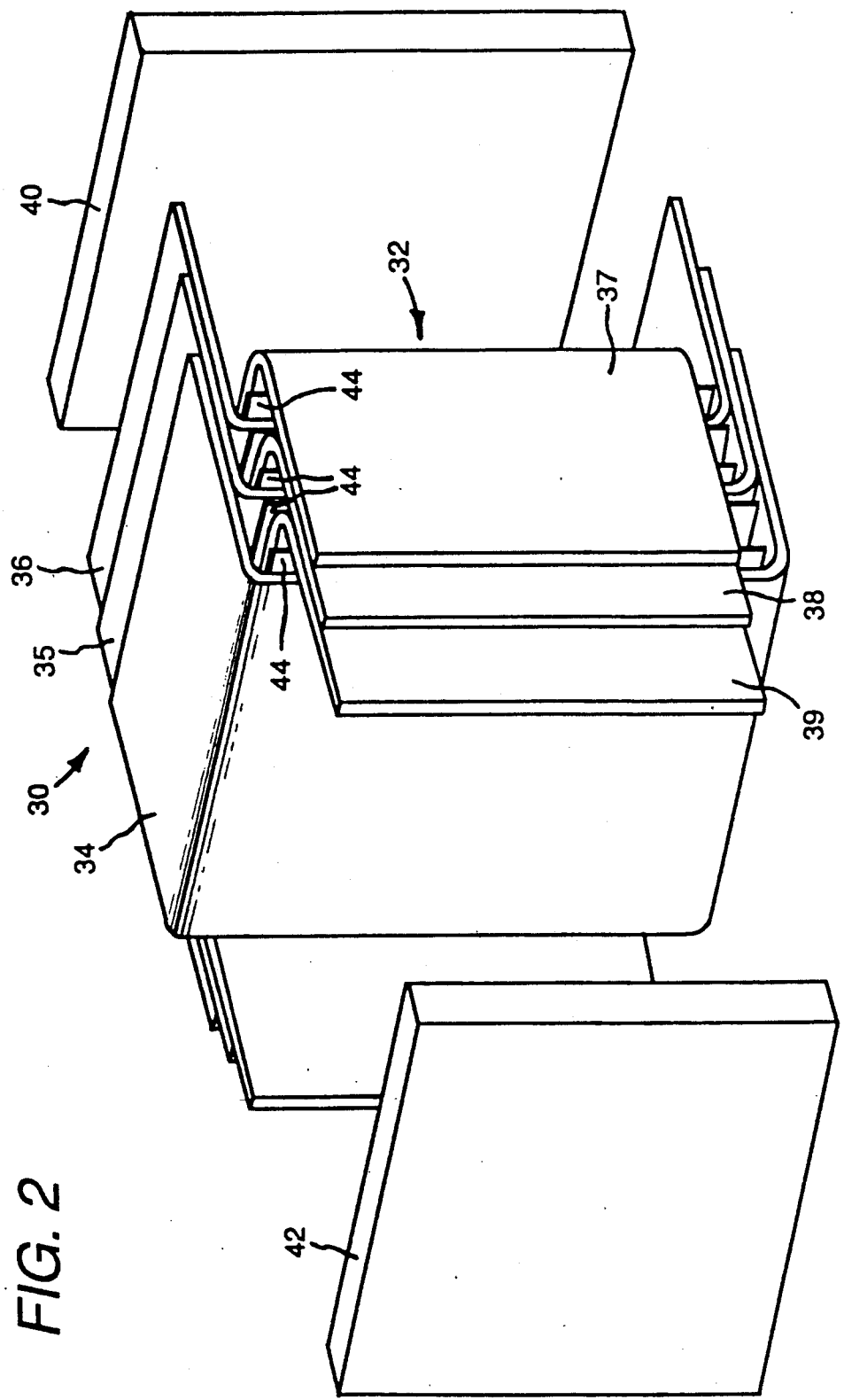
FIG. 2 is an exploded, isometric view of a high-frequency capacitor according to a preferred embodiment of the present invention.

Capacitors $C_s$ and $C_p$ may be advantageously implemented using a high-frequency capacitor of the present invention. FIG. 2 illustrates one preferred embodiment of a high-frequency capacitor of the present invention comprising a first conductive member 30 and a second conductive member 32. The first and second conductive members each include a plurality of substantially U-shaped metal plates, e.g. comprised of silver, copper, silver-plated copper or any other suitable metal or combination of metals. By way of illustration, first conductive member 30 is shown as having three U-shaped metal plates 34-36, and second conductive member 32 is shown as having three U-shaped metal plates 37-39. The first and second conductive members each further include a terminal plate 40 and 42, respectively, coupled between the ends of their respective metal plates. Terminal plates 40 and 42 serve to couple the high-frequency capacitor to other circuit elements. As illustrated, the metal plates of the first and second conductive members are interleaved with a dielectric material 44 disposed between adjacent metal plates. Exemplary dielectric materials include synthetic resin polymers, such as those sold under the trademark Teflon, or polyimide films such as that sold under the trademark Kapton, by E. I. du Pont de Nemours and Company. In the embodiment of FIG. 2, terminal plates 40 and 42 are situated at opposite ends of the high-frequency capacitor.

The following equation represents a well-known equation for determining capacitance C of a capacitor:

$$C = \epsilon \frac{A}{d},$$

where $\epsilon$ represents the dielectric constant of dielectric material 44 disposed between the conducting plates of the capacitor, A represents the area of the conducting plates, and d represents the distance between the conducting plates. From the equation for capacitance, it is apparent that the capacitance of the high-frequency capacitor of the present invention is proportional to the area of the overlapping plates. Specifically, the capacitance of the high-frequency capacitor is proportional to $(n-1)A$, where n represents the number of overlapping plates and A represents the area of the overlapping portion of one plate.

Advantageously, the high-frequency capacitor of the present invention introduces a negligible inductance into the circuit in which it is employed. In particular, the current path length from other circuit elements to the high-frequency capacitor is relatively short due to the width of the metal plates in addition to the U-shape thereof. The U-shape configuration enables current to be supplied to the capacitor from two directions, rather than one as in the case of a capacitor having flat, parallel plates, thereby shortening the current path length. And, since the inductance of an electrical conductor decreases with increasing width and decreasing length, the high-frequency capacitor of the present invention is a relatively low-inductance element.

Figure 3:
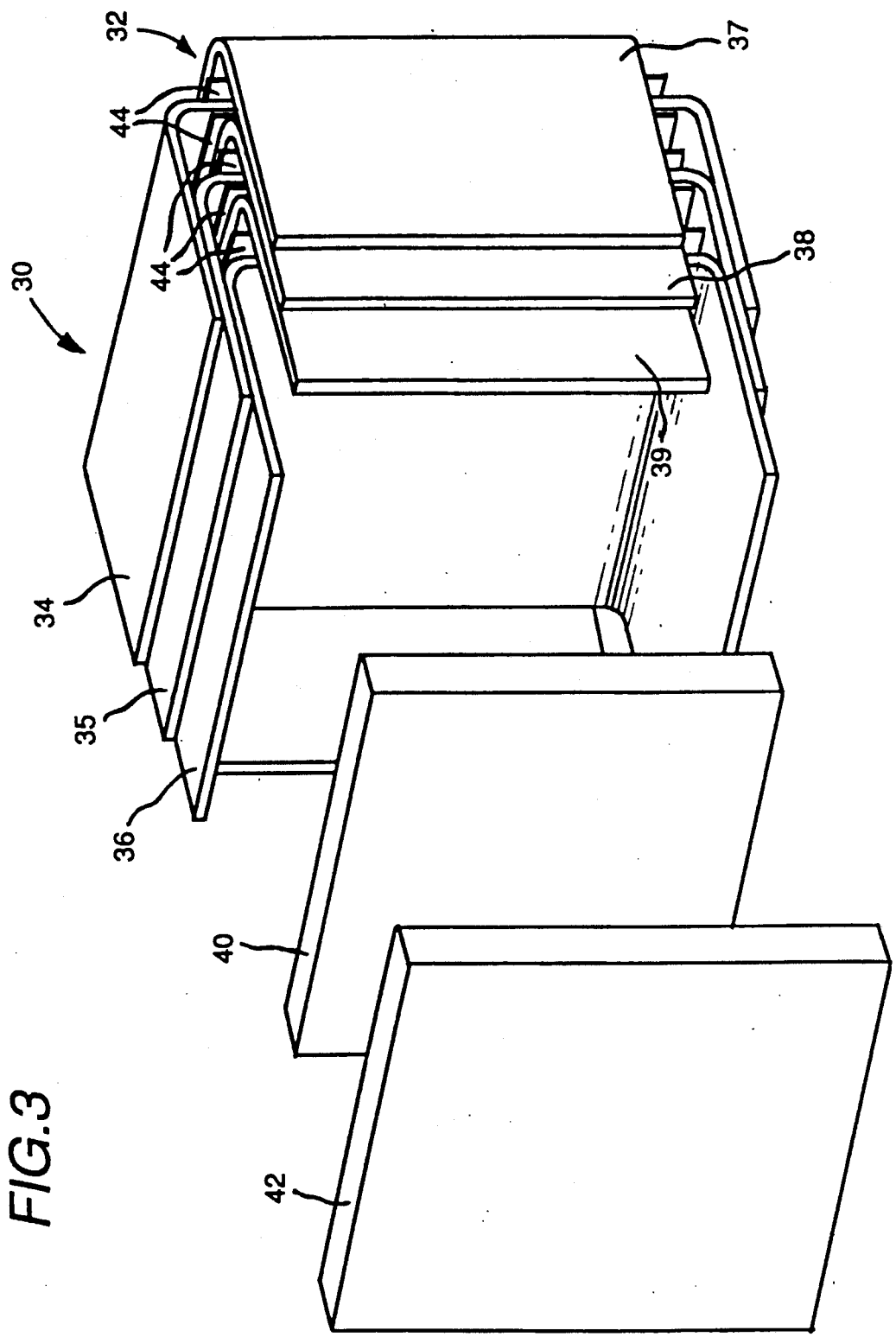
FIG. 3 is an exploded, isometric view of a high-frequency capacitor according to an alternative preferred embodiment of the present invention.

FIG. 3 illustrates another preferred embodiment of a high-frequency capacitor of the present invention wherein terminal plates 40 and 42 are situated on the same side of the capacitor. That is, terminal plate 40 is coupled to plates 34-36 of conductive member 30, and terminal plate 42 is coupled to plates 37-39 of conductive member 32. When the high-frequency capacitor is assembled according to this embodiment, terminal plates 40 and 42 are spaced apart from each other or, alternatively, have a suitable dielectric situated therebetween. The embodiment of FIG. 3 is particularly suitable for use with coaxial type circuit connections.

Figure 4:
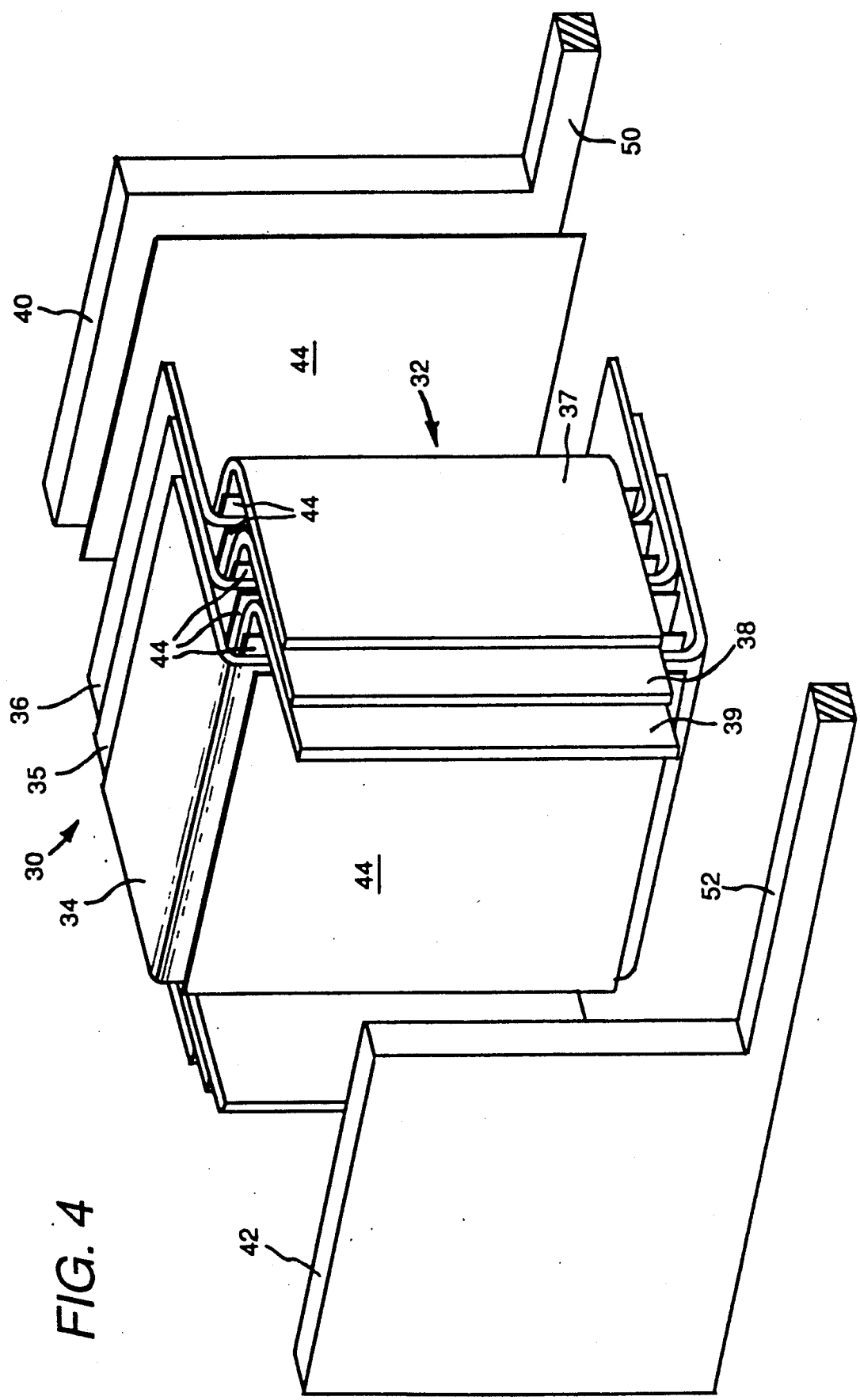
FIG. 4 is an exploded, isometric view of a high-frequency capacitor according to another alternative preferred embodiment of the present invention.

FIG. 4 illustrates yet another preferred embodiment of a high-frequency capacitor of the present invention. In this embodiment, terminal plates 40 and 42 serve as conductive plates of the high-frequency capacitor. Hence, plates 42 and 34 and plates 40 and 37 are respectively situated in closer proximity to each other as compared with the embodiment of FIG. 2; and dielectric material 44 is disposed between terminal plate 42 and plate 34, and between terminal plate 40 and plate 37. In addition, terminals 50 and 52, which comprise extensions of terminal plates 40 and 42, respectively, are employed for connection to other circuit elements. The embodiment of FIG. 4 is particularly suitable for use with an electrodeless HID lamp coil configuration such as that described in the G. A. Farrall, U.S. patent application Ser. No. 493,266, cited hereinabove.

Figure 5:
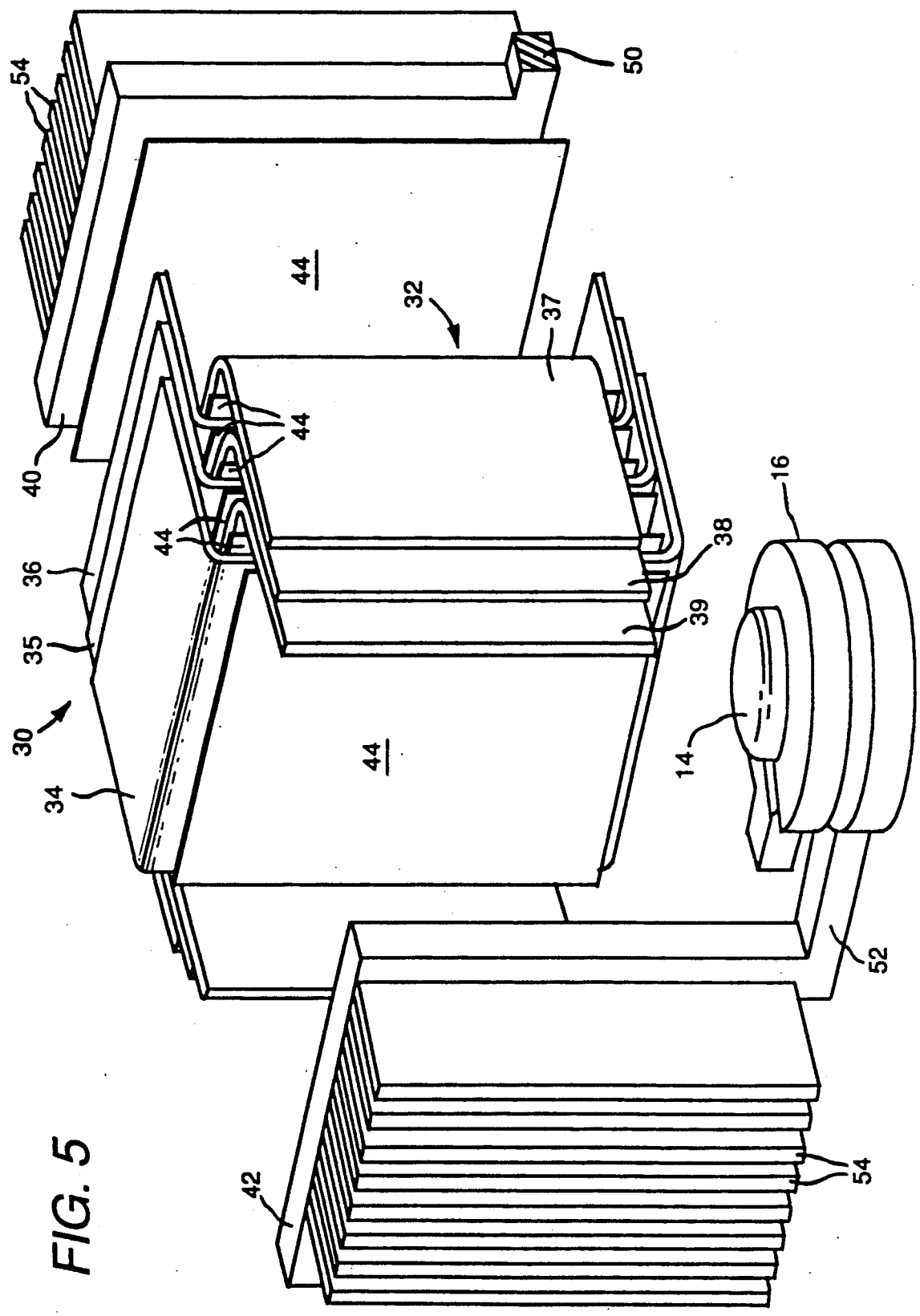
FIG. 5 is an exploded, isometric view of a high-frequency capacitor according to the present invention integrated with a heat sink and coupled to an HID lamp excitation coil.

FIG. 5 illustrates a two-turn excitation coil 16 according to the Farrall patent application coupled to a high-frequency capacitor according to the embodiment of FIG. 4. Advantageously, the high-frequency capacitor is closely coupled to the excitation coil of the HID lamp. Hence, a low-inductance coupling is achieved, and higher efficiency operation is obtained. In addition, FIG. 5 shows how a heat sink may be advantageously integrated with the high-frequency capacitor of the present invention. That is, any of the outer surfaces of the high-frequency capacitor may comprise heat sink planes on which heat sink fins are mounted. For purposes of illustration, terminal plates 40 and 42 are shown as comprising heat sink planes on which heat sink fins 54 are mounted.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A high-frequency capacitor, comprising:
   a first conductive member including a plurality of substantially U-shaped metal plates disposed substantially parallel to each other, said first conductive member further including a first terminal plate disposed between the ends thereof;
   a second conductive member including a plurality of substantially U-shaped metal plates disposed substantially parallel to each other and interleaved with the metal plates of said first conductive member, said second conductive member further including a second terminal plate disposed between the ends thereof; and
   a dielectric material disposed between the adjacent metal plates of said first and second conductive members.

2. The high-frequency capacitor of claim 1 wherein said terminal plates are disposed on opposite sides of said high-frequency capacitor.

3. The high-frequency capacitor of claim 1 wherein said terminal plates are disposed on the same side of said high-frequency capacitor.

4. The high-frequency capacitor of claim 1 wherein said metal plates are comprised of silver.

5. The high-frequency capacitor of claim 1 wherein said metal plates are comprised of silver-plated copper.

6. The high-frequency capacitor of claim 1 wherein said metal plates are comprised of copper.

7. The high-frequency capacitor of claim 1 wherein said dielectric material comprises a Teflon polymer resin.

8. The high-frequency capacitor of claim 1 wherein said dielectric material comprises Kapton polyimide film.

9. A ballast for an electrodeless high intensity discharge lamp of the type having an excitation coil situated about an arc tube for exciting a plasma discharge therein upon application of a radio frequency signal to said excitation coil, said ballast comprising:
   first and second switching devices connected in series in a half-bridge configuration with a junction therebetween;
   ballast drive means coupled to said first and second switching devices, said ballast drive means, when energized with RF energy, alternately driving said first and second switching devices; and
   resonant circuit means coupled to said first and second switching devices at the junction therebetween, said resonant circuit means comprising said excitation coil and at least one high-frequency capacitor;
   said high-frequency capacitor comprising:
   (a) a first conductive member including a plurality of substantially U-shaped metal plates disposed substantially parallel to each other, said first conductive member further including a first terminal plate disposed between the ends thereof;
   (b) a second conductive member including a plurality of substantially U-shaped metal plates disposed substantially parallel to each other and interleaved with the metal plates of said first conductive member, said second conductive member further including a second terminal plate disposed between the ends thereof; and
   (c) a dielectric material disposed between the adjacent metal plates of said first and second conductive members.

10. The ballast of claim 9 wherein said terminal plates are disposed on opposite sides of said high-frequency capacitor.

11. The ballast of claim 10 further comprising heat sink means for removing heat from said excitation coil produced during operation of said lamp.

12. The ballast of claim 11 wherein said heat sink means is integrated with said high-frequency capacitor.

13. The ballast of claim 12 wherein said terminal plates of said high-frequency capacitor comprise heat sink planes.

14. The ballast of claim 13 wherein said heat sink means further comprises heat sink fins affixed to said heat sink planes.

15. The ballast of claim 9 wherein said terminal plates are disposed on the same side of said high-frequency capacitor.

16. The ballast of claim 15 further comprising heat sink means for removing heat from said excitation coil produced during operation of said lamp.

17. The ballast of claim 16 wherein said heat sink means is integrated with said high-frequency capacitor.

18. The ballast of claim 9 wherein said metal plates are comprised of silver.

19. The ballast of claim 9 wherein said metal plates are comprised of silver-plated copper.

20. The ballast of claim 9 wherein said metal plates are comprised of copper.

21. The ballast of claim 9 wherein said dielectric material comprises a Teflon polymer resin.

22. The ballast of claim 9 wherein said dielectric material comprises Kapton polyimide film.

* * * * *